UNITED STATES PATENT OFFICE.

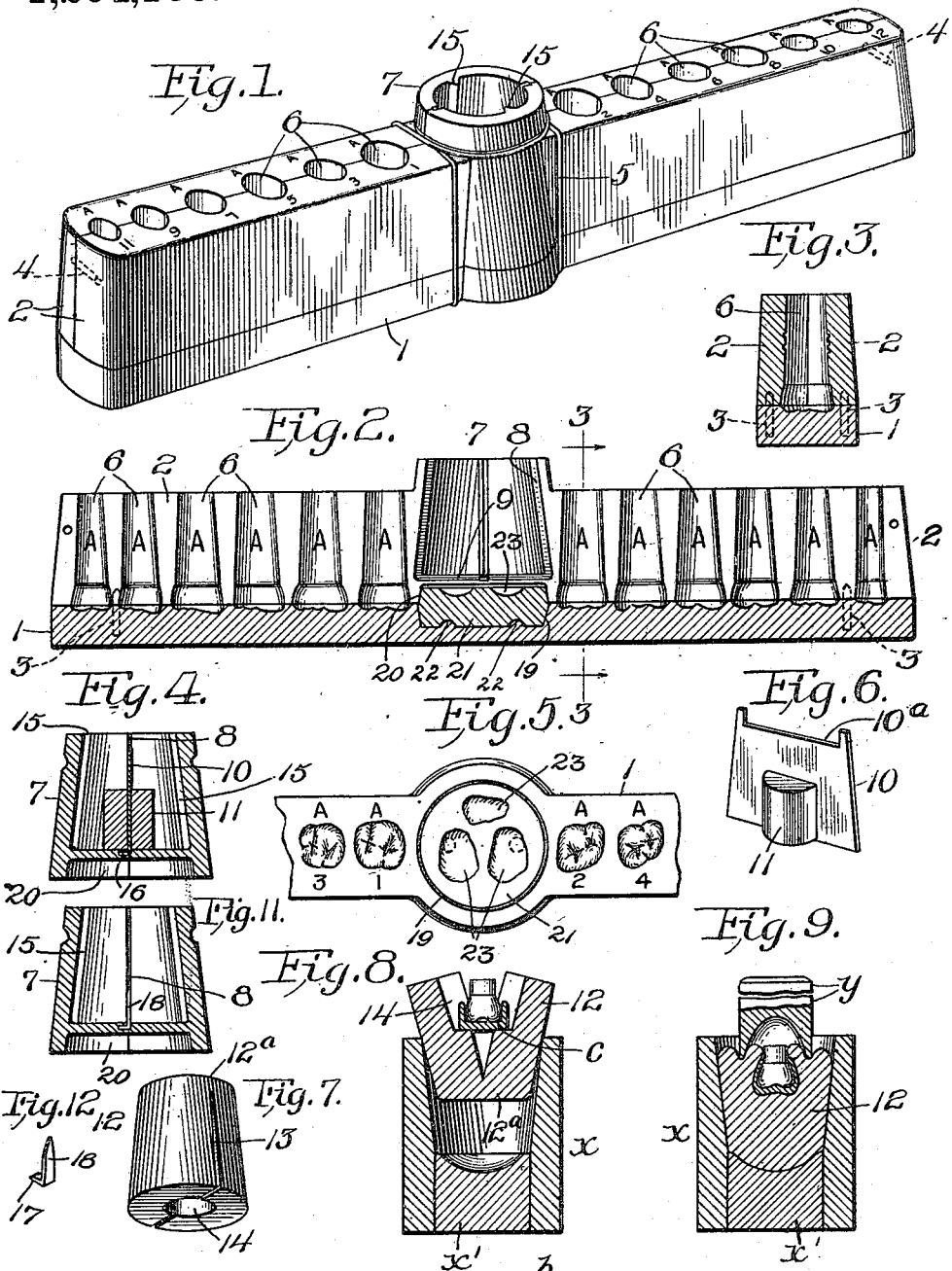

SAMUEL A. LEVIN, OF CHICAGO, ILLINOIS.

APPARATUS FOR MAKING ARTIFICIAL TOOTH-CROWNS.

1,204,166.  Specification of Letters Patent.  Patented Nov. 7, 1916.

Application filed February 15, 1915.  Serial No. 8,150.

*To all whom it may concern:*

Be it known that I, SAMUEL A. LEVIN, a citizen of the United States, residing at Chicago, in the county of Cook and State of Illinois, have invented certain new and useful Improvements in Apparatus for Making Artificial Tooth-Crowns, of which the following is a specification.

Heretofore seamless gold crowns have usually been produced by means of improvised single molds, the molds being obtained as follows: The broken-down tooth which was to be crowned was first restored to normal form. The dentist then took an impression of this tooth and adjacent teeth in wax, and the impression was filled with plaster. After the plaster hardened, the particular tooth to be crowned was cut out of the plaster mass and carved into proper form. From this plaster tooth model a mold was made by investing the tooth form in suitable material, as, for example, a low-fusing metal, the mold being then split to permit removal of the tooth model and insertion of the gold shell or thimble. The shell was then swaged or expanded into conformity to the mold. These steps necessarily consumed a considerable amount of time and were carried out for each tooth to be crowned.

The object of this invention, generally stated, is to obviate the expenditure of a large part of the time and labor heretofore necessary in the production of dental crowns. This object is attained by providing improved means for the production of an assortment of metallic tooth models which may be carried in stock by the dentist and shaped into the likeness of teeth to be crowned as occasion arises; by providing improved means for forming swaging blocks; by providing improved means for swaging the shell or thimble into conformity with the model; and by providing an assortment of dies for use in forming the cusps and sides of two-piece crowns.

In the accompanying drawings, Figure 1 is a perspective view of a mold for producing tooth models. Fig. 2 is a longitudinal central section of the mold. Fig. 3 is a transverse sectional view of the mold, taken in the plane of dotted line 3—3 of Fig. 2. Fig. 4 is a sectional view illustrating the use of the apparatus in producing a swaging block. Fig. 5 is a fragmental face view of the bottom section of the mold. Fig. 6 is a perspective view of a division plate used in the formation of swaging blocks. Fig. 7 is a perspective view of a swaging block. Figs. 8 and 9 are views showing successive stages in the process of swaging a gold thimble. Fig. 10 is a perspective view of a tooth model formed by means of the mold. Fig. 11 is a view similar to that of Fig. 4, but showing the cup as arranged for use in producing a die. Fig. 12 is a perspective view of a pin for use in supporting the gold band and carved tooth surface for which a die is to be made.

The mold illustrated in Figs. 1 to 5, inclusive, comprises a bottom section 1 and two side sections 2. These sections may be secured together by any suitable means, as, for example, pairs of posts or dowel pins 3 fixed in the bottom section 1 and entering suitable openings in the side sections 2; and two dowel pins 4 set in one of the side sections 2 and extending into openings in the other side section. If desired, the three parts of the mold may be further secured together by means of an endless rubber band 5 looped around the mold, the ends of the loop engaging opposite sides of a cup to be hereinafter described. The three parts of the mold are preferably formed of metal.

The mold contains a plurality of differing cavities 6 for use in casting a plurality of tooth models *a* (Fig. 10); and it will be evident that by making the mold of sufficient size or by using a number of different molds, a quantity of tooth models representing the average forms generally required with some of the usual deviations may be obtained. These models may be cast of suitable material, such as one of the well-known readily-fusible alloys. That portion of each cavity 6 which represents the sides of a tooth and the stem *b* is formed one-half in each of the mold-sections 2. That portion of the cavity 6 which represents the cusps of the tooth is formed in the mold-section 1.

By means of a plurality of molds similar to that illustrated in Fig. 1, a dentist may make up and keep on hand a complete assortment of tooth models formed of readily-fusible metal. Ordinarily about five molds will be required to produce a full assortment of tooth models. The molds may be marked with the letters of the alphabet, as A, B, C, D and E. Those mold cavities 6 which produce right teeth may be denoted by even numbers, and the cavities that produce left teeth may be designated by odd numbers. Preferably each mold is capable of producing both right and left teeth. The manner in which the cavities 6 are marked upon the mold-sections 1 and 2 will be evident from the drawings. Any other suitable system of designating marks may be used. For convenience in identifying the various tooth models, it is desirable that each model bear the letter and number designating the cavity 6 in which the given model was cast. Therefore the cavities 6 are preferably formed so as to produce a letter on one side of the stems $b$ and a number on the other side of the stems.

In the production of a seamless gold crown, the dentist selects from his assortment of metallic tooth models a model which closely approximates the tooth which is to be crowned, and after taking the necessary measurements of the tooth, he files or otherwise shapes the metallic model into conformity with the tooth to be restored. The model is now ready to be used in the production of a swaged seamless crown, and it will be evident that its production has consumed but a small fraction of the time required to make a model by means of a mold made from an impression of the patient's teeth.

The swaging operation may be conveniently performed by placing a gold thimble $c$ in a block of lead, or other relatively soft metal, the tooth model being positioned within the thimble, and pressing the lead against the thimble so as to swage the latter into contact with the model. For the production of such a swaging block, I have provided means to be now described.

In addition to the cavities 6, the mold comprises a cup 7 formed one-half in each of the sections 2, the cup being preferably located midway of the length of the mold. The interior of the cup 7 is upwardly tapered. In the interior side walls of the cup are formed two diametrically opposite grooves 8 connected by a groove 9 in the bottom of the cup, said grooves being preferably formed one-half in each mold section 2. The grooves 8 and 9 serve to position a division plate 10, said plate having a boss 11 located centrally of its lower end. The upper end of the plate 10 is cut out as at $10^a$ in order that the molten lead may extend entirely across the upper portion of the cup 7 when said cup is filled with lead. The division plate 10 having been positioned in the grooves 8 and 9, a suitable quantity of molten lead is poured into the cup 7. There is thus cast a lead block similar to that shown in Fig. 7 and comprising a tapering body 12 which is divided by a slot 13 into two halves connected by the integral portion $12^a$, said body having a central recess 14. A suitable number of swaging blocks may be made up by the dentist and carried in stock for immediate use.

Assuming that a gold shell or thimble $c$ is to be swaged into conformity to a model $a$ which has been shaped into the likeness of the tooth to be restored, the operator takes a lead block 12 and bends the two halves thereof apart to a suitable extent, places the thimble in the central cavity 14 of the block, places the metallic model within the thimble and sets the lead block in an upwardly tapering or flaring cup $x$, as indicated in Fig. 8. By striking upon the upper end of the stem $b$ of the tooth model, the lead block will be forced down into the cup, the tapering form of the cup $x$ causing the lead block to close in upon the thimble and press the same against the tooth model. After the lead block has been thus forced part-way into the cup $x$, the operator cuts off a portion of the protruding stem $b$ of the tooth model and completes the swaging operation by hammering upon the lead block by means of a mallet (not shown) and a swaging punch $y$, as indicated in Fig. 9. The operator may then drive the swaging block 12 out of the cup $x$ by inverting the cup and striking upon the plug $x'$. After the block 12 has been removed from the cup, said block may be split and the crown and model removed. The model is then removed from the crown by placing the crown and model in boiling water to melt the model.

The cup 7 may also be used in making a special tooth model to fit a particular tooth. In making such a special model, the dentist first takes a wax impression of the patient's tooth, and makes a plaster pattern of the tooth from the wax impression. The side sections 2 of the mold having been separated from each other and from the bottom section 1, each half of the cup 7 is filled with a suitable plastic material, lycopodium or other suitable powdered material being sprinkled on the surface of the plastic material in each cup-section to prevent said surfaces from sticking together when the two halves of the mold are pressed together. The plaster pattern is placed upon the surface of the plastic material in one of the halves of the cup 7 and the two halves of the mold pressed together until the pattern is embedded in the plastic material. The mold is then opened, the pattern removed, the mold again closed, and low-fusing metal or the like poured into the mold. The tooth model thus obtained may be used as hereinbefore described in making the crown.

In making a two-piece crown, it is the practice of some dentists to fit a gold band to the tooth, fill the band with carving wax or other suitable material, and have the patient bite into the wax, thereby obtaining an impression in wax which articulates with the opposed tooth. The gold band with its filling of wax is then removed from the tooth to be crowned. The next step is to produce a die conforming to the tooth surface impressed upon the wax, in order that said die may be used in the production of the cusps of a two-piece crown. In order that the cup 7 may be used in the production of such a die, I provide diametrically opposite ribs 15 upon the interior walls of the cup 7, and in the bottom wall of one of the halves of the cup is formed an opening or socket 16 to receive the angular shank 17 of a pin 18. When the shank 17 of the pin 18 is inserted into the opening 16, and the two halves of the cup 7 are in contact with each other, the pin 18 extends axially of the cup. Assuming that a gold band and tooth surface have been produced as hereinbefore described, the lower end of the band is filled with a suitable plastic material and the whole impaled upon the pin 18, said pin serving to hold the band central within the cup 7. A quantity of molten metal of low fusing point is then poured into the cup 7. After the metal has cooled the cup 7 is opened to release the block of metal. The block is then split by means of the device ordinarily used by dentists for this purpose, the blades of said device entering the grooves formed in the block by the ribs 15. The block having been split, the pattern (that is to say, the gold band with its tooth surface) is removed. The two halves are then secured in contact with each other and used as a die in expanding a piece of gold plate to form the cusps of the crown.

The bottom section 1 of the mold may be used as a counter-die in the production of caps to be used in making two-piece crowns. A piece of gold plate having been placed over the cavity in the mold-section 1 which approximates most closely to the cusps of the tooth to be restored, the plate is swaged into the die in the usual manner.

In that portion of the mold-section 1 which is immediately below the cup 7 is formed a circular recess 19. Directly above the recess 19 is a similar recess 20. In the recesses 19 and 20 is a removable disk 21 which may be held against rotation by means of one or more bosses 22 on the bottom wall of the recess 19, said bosses fitting into openings in the bottom of the disk 21. In the upper face of the disk 21 is a plurality of recesses 23 constituting dies for use in swaging the sides of crowns. An assortment of disks 21 provided with die-recesses 23 of various forms may be kept on hand. The recess 19 may also be used as follows: It may be filled with hard wax, dentallac or lead; an impression of the cusps of a tooth model made in said material while the latter is plastic; and said impression used as a die in swaging a gold plate to form the cusps of a two-piece crown.

It will be seen that the apparatus herein disclosed is adaptable for use in every phase of crown-making.

I claim as my invention:

1. In combination, two elongated mold sections, each provided intermediate its ends with a cup section, said cup sections forming a cup having diametrically opposite grooves in its internal walls, and a division plate adapted to be positioned in said cup with its edges lying in said grooves, said plate stopping short of one end of the cup, and said plate having an enlargement.

2. The combination of a tri-sectional dental mold comprising a bottom section and two side sections releasably secured together, said bottom section having a recess in its upper side, and the side sections forming between them a similarly shaped recess registering with the first mentioned recess, and a member removably positioned in said recesses, said member having a counterdie recess in its upper side.

3. The combination of a cup and a division plate adapted to be positioned in said cup, said plate stopping short of one end of the cup, said plate having a central enlargement.

In testimony whereof, I hereunto set my hand in the presence of two witnesses.

SAMUEL A. LEVIN.

In the presence of—
GEORGE L. CHINDAHL,
MARGARET H. MANN.

Copies of this patent may be obtained for five cents each, by addressing the "Commissioner of Patents, Washington, D. C."